United States Patent
Johnson et al.

(10) Patent No.: US 7,019,711 B2
(45) Date of Patent: Mar. 28, 2006

(54) COUPLED TRANSPONDER AND ANTENNA SYSTEM AND METHOD

(75) Inventors: David Allan Johnson, Thornton, CO (US); Joseph Michael Letkomiller, Thornton, CO (US); Richard Stephen Pollack, Boulder, CO (US); Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 114 days.

(21) Appl. No.: 10/653,493

(22) Filed: Sep. 2, 2003

(65) Prior Publication Data

US 2005/0099283 A1    May 12, 2005

Related U.S. Application Data

(63) Continuation of application No. 10/320,947, filed on Dec. 16, 2002.

(51) Int. Cl.
*H01Q 1/42* (2006.01)
*B60C 23/00* (2006.01)

(52) U.S. Cl. ............... 343/872; 343/712; 343/866; 343/872; 340/447; 340/572.7

(58) Field of Classification Search ............... 343/741, 343/872, 866, 711–712; 340/445, 442, 58, 340/447, 572, 870, 572.7; 152/152.1, 367, 152/523–524, 517, 454
See application file for complete search history.

(56) References Cited

U.S. PATENT DOCUMENTS

| | | | |
|---|---|---|---|
| 4,074,227 A | 2/1978 | Kalmus ............... 340/58 |
| 4,319,220 A * | 3/1982 | Pappas et al. ........ 340/447 |
| 4,384,289 A * | 5/1983 | Stillwell et al. ..... 340/870.17 |
| 4,911,217 A | 3/1990 | Dunn et al. ........ 152/152.1 |
| 5,181,975 A * | 1/1993 | Pollack et al. ..... 152/152.1 |
| 5,218,861 A * | 6/1993 | Brown et al. ........ 73/146.5 |
| 5,270,717 A | 12/1993 | Schuermann ............ 342/22 |
| 5,304,172 A | 4/1994 | Manoukian et al. ..... 606/15 |
| 5,479,171 A | 12/1995 | Schuermann ........... 342/44 |
| 5,491,483 A | 2/1996 | D'Hont ............... 342/42 |
| 5,500,065 A | 3/1996 | Koch et al. .......... 156/123 |
| 5,541,574 A * | 7/1996 | Lowe et al. .......... 340/447 |
| 5,977,870 A * | 11/1999 | Rensel et al. ........ 340/447 |
| 6,062,072 A | 5/2000 | Mock et al. .......... 73/146.5 |
| 6,147,659 A | 11/2000 | Takahashi et al. ..... 343/866 |
| 6,228,929 B1 | 5/2001 | Larson et al. ........ 524/495 |
| 6,255,940 B1 | 7/2001 | Phelan et al. ........ 340/447 |
| 6,369,712 B1 | 4/2002 | Letkomiller et al. ... 340/572.1 |
| 6,438,193 B1 * | 8/2002 | Ko et al. ............ 377/24.1 |
| 6,534,711 B1 * | 3/2003 | Pollack .............. 174/52.2 |
| 6,546,982 B1 * | 4/2003 | Brown et al. ........ 152/152.1 |
| 6,581,657 B1 * | 6/2003 | Brown ............... 152/152.1 |

(Continued)

FOREIGN PATENT DOCUMENTS

EP    1310386    5/2003

(Continued)

*Primary Examiner*—Trinh V Dinh
*Assistant Examiner*—Chuc Tran
(74) *Attorney, Agent, or Firm*—Richard B. O'Planick (57) ABSTRACT

An annular antenna loop is electrically coupled to a transponder. The antenna and the transponder are at least partially embedded into a non-conductive carrier strip to form a ring assembly to render the antenna and transponder package unitarily transportable. The annular assembly affixes to a tire in a post-manufacture attachment procedure and at a location that minimizes exposure of the annular apparatus to strain and to electromagnetic interference from the metallic wheel rim.

20 Claims, 9 Drawing Sheets

U.S. PATENT DOCUMENTS

| | | | |
|---|---|---|---|
| 6,591,671 B1 * | 7/2003 | Brown | 73/146.5 |
| 6,788,192 B1 * | 9/2004 | Shimura | 340/447 |
| 6,807,853 B1 * | 10/2004 | Adamson et al. | 73/146 |
| 2004/0021559 A1 * | 2/2004 | O'Brien | 340/445 |

FOREIGN PATENT DOCUMENTS

| | | |
|---|---|---|
| JP | 63306905 | 4/1989 |
| WO | 9012474 | 10/1990 |
| WO | 9929525 | 6/1999 |
| WO | WO 99/29522 | 6/1999 |
| WO | WO 99/29523 | 6/1999 |
| WO | WO 99/29525 | 6/1999 |
| WO | WO 99/52723 | 10/1999 |
| WO | WO 99/53740 | 10/1999 |
| WO | WO 01/12452 | 2/2001 |
| WO | WO 01/12453 | 2/2001 |
| WO | WO 01/36220 | 5/2001 |

* cited by examiner

COUPLED TRANSPONDER AND ANTENNA SYSTEM AND METHOD

This is a Continuation of application Ser. No. 10/320,947, filed Dec. 16, 2002, presently pending.

FIELD OF THE INVENTION

The invention relates generally to the assembly and disposition of an annular apparatus, including an antenna and a transponder, in a tire for the purpose of transmitting tire or wheel data and, more specifically, to the method of assembly and location of the annular apparatus relative to the tire or wheel in order to optimize competing performance criteria.

BACKGROUND OF THE INVENTION

It is common to employ annular apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

As is evidenced by the references described below incorporated herein by reference, it is known in the art to employ an annular antenna to transmit, at radio frequencies, data from a transponder contained within the structure of a tire or tire and wheel assembly. The antenna and transponder may be incorporated into a tire during "pre-cure" manufacture. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire.

Not only is the risk of damage to an annular antenna-transponder system present during its incorporation into a tire during manufacture, but damage to such systems are not uncommon from operation of the tire on a vehicle. Loop antennas in known tire pressure monitoring systems have heretofore been placed into the tire during the curing process either at the crown of the tire, the bead of the tire, or the sidewall. Antennas and transponders located in the crown are subjected to substantial compressive strain and at the sidewall a high strain amplitude. Such locations represent high load and deformation regions of the tire. Consequently, antenna, transponders, and the connections therebetween in such locations are prone to breakage and mechanical or electrical failure.

Other issues relevant to mounting a transponder module in a tire include replacing the entire transponder module if it requires replacement and, in the case of battery-powered ("active") transponders, replacing the battery if required. Preferably, the transponder, whether "active" or "passive" should represent only a fractional cost of the overall tire. Hence, replacing an entire tire because of an inoperative transponder would be highly undesirable. In the case of permanently embedding the transponder within the tire, such as is shown at FIG. 13 of U.S. Pat. No. 5,500,065, replacing the transponder unit or any component thereof is a virtual impossibility.

U.S. Pat. No. 5,181,975 discloses a number of locations and techniques for mounting a transponder within a tire. In a tire that has already been manufactured, the transponder may be attached to the axially inner side of the inner liner or to the axially outer side of the tire sidewall by means of a tire patch or similar material or device. U.S. Pat. No. 5,218,861 also discloses locations and techniques for mounting an integrated circuit transponder and pressure transducer within a pneumatic tire. The common problem shared in each prior art approach is that the transponder and antenna represent a system. For best magnetic coupling and to enable a 360 degree continuous read, it is desirable for the antenna to be annular The manner of establishing an effective and mechanically secure coupling between a transponder and annular antenna is problematic and a satisfactory solution is not found in the art.

A final design challenge is to provide a standard platform capable of accommodating the wide variety of transponders and various types and sizes of pneumatic tires commercially available in the industry. Optimally, a standardized annular apparatus would accept components of different manufacturers and such uniformity in the annular system platform would serve to enhances its commercial acceptance.

It is another aspect of the invention to provide method and apparatus for mounting a transponder module in a pneumatic tire in such a manner that the transponder may conveniently be inserted, removed, replaced and/or maintained, either during tire manufacture or after. Additionally, the annular apparatus and method of employing same would operate to optimally locate the transponder sensors within a tire cavity to facilitate accurate measurement.

It is another aspect of the present invention to provide method and apparatus for mounting a transponder and an antenna for the transponder within a pneumatic tire, and to provide for a mechanically decoupled relationship between the transponder and the antenna.

It is another aspect of the invention to provide a method for mounting a transponder module in a pneumatic tire at any point in the tire manufacturing process, with minimal impact on tire performance.

One of the two spaced-apart metallic beads of a tire can satisfy the requirement of a large-diameter transformer primary winding mounted within a tire as described in U.S. Pat. No. 5,181,975 and U.S. Pat. No. 5,218,861. The disadvantage is that while the bead location in a tire represents a low load and deformation region, this advantage is countered by the undesirable electromagnetic influence associated with the electrically conductive metallic wheel upon which the tire is mounted and to which the bead is closely adjacent. Consequently, location of the antenna-transponder assembly at the bead may protect the assembly from resulting strain from tire operation but communication quality may prove unsatisfactory due to interference problems attendant such a location.

Moving the antenna away from the bead region of the tire to the crown area, as taught by PCT Application WO 99/29525 avoids magnetic interference caused by the wheel rim but places the antenna in a high strain region. Consequent damage to the antenna from tire operation can result.

Depending on the RF generator, the transponder or other electronic devices involved, and input power requirements of the system, the antenna must also meet certain conductivity requirements as well as the mechanical requirements summarized previously. The cable construction of choice is one or more wires composed of copper, copper-clad steel, aluminum, or any other highly conductive metal. The wire for the antenna must have minimal electrical resistance so as to minimize power losses and signal transmission losses. In passive systems where power is supplied to the transponder package by a magnetic coupling between the antenna and a transponder coil, the antenna and antenna to transponder coupling must also facilitate a high energy transfer.

U.S. Pat. No. 4,319,220 discloses a system for monitoring tire pressure comprising wheel units in the tires and a common receiver. U.S. Pat. No. 6,147,659 discloses the use of metallic component members in a tire as an antenna directly connected to a transponder. U.S. Pat. No. 4,074,227 discloses a tire pressure indicator for a tire and includes a transponder coupled to a signal coil that is disposed as a circular loop about the tire. U.S. Pat. No. 5,491,483 discloses a single loop annular antenna mechanically and magnetically coupled to a transponder through an impedance transformer. U.S. Pat. No. 5,479,171 discloses a double coupled transponder and antenna assembly for a tire in which the antenna is mounted about the perimeter of a tire and includes a coupling coil at one end. A transponder is located in close proximity and is loosely coupled to the coil. Similarly, U.S. Pat. No. 5,270,717 discloses an RF-ID transponder having a long antenna coupled to a transponder by a loose coupling coil. U.S. Pat. No. 5,304,172 B discloses a tire inflation pressure monitoring system that includes a loop antenna coupled to a receiver. U.S. Pat. No. 6,062,072 discloses a tire pressure monitoring system that includes a transmitter having an antenna with several windings which are integrated into the side walls or tread region of a tire. PCT Application No. PCT/US97/22470 discloses an annular apparatus that may be incorporated in a ring of elastomeric material attached to the rim or embedded in the tire at its equatorial plane. U.S. Pat. No. 4,911,217 discloses a tire transponder and signal transmitter. U.S. Pat. No. 5,181,975 discloses a tire transmitter using the bead of the tire as a primary transformer winding. U.S. Pat. No. 5,218,861 discloses a transponder for a tire having a coil antenna. U.S. Pat. No. 6,228,929 discloses a tire comprising a strip of electrically conductive rubber. U.S. Pat. No. 6,255,940 teaches a patch mounted tire tag. U.S. Pat. No. 6,369,712 discloses an adjustable temperature sensor for a tire. PCT Application No. PCT/US99/1866 discloses a transponder and coupling element for a tire. PCT Application No. PCT/US99/20271 discloses a tire monitoring system. PCT Application No. PCT/US99/27094 discloses a transponder and antenna apparatus for pneumatic tires. PCT Application No. PCT/US99/18610 discloses a tire monitoring system including an annular antenna. PCT Application No. PCT/US97/22463 discloses an annular apparatus for a tire including an antenna embedded in the tire at its equatorial plane.

While the prior art listed above functions well and represents several viable approaches toward meeting the needs of the industry, certain deficiencies inherent in each approach prevent the collective prior art from achieving a satisfactory system, assembly, and method for mechanically integrating an annular antenna-transponder system into a tire. The prior art teaches antenna to transponder coupling techniques that achieve a less than satisfactory coupling factor. Moreover, the prior art presents less durable than desired transponder to loop connections that are, in general, complicated to effect and prone to breakage during tire manufacture and operation. Additionally, the prior art methods of incorporating an annular antenna-transponder system into a tire do not facilitate a convenient retrofit incorporation of the monitoring system into previously manufactured tires and do not readily allow for easy repair or replacement of the annular assembly or components should the need arise. Finally, existing prior art systems for coupling an annular antenna to a transponder package do not individually or collectively achieve the foregoing mechanical objectives while positioning the apparatus in an optimal location on or in a tire.

SUMMARY OF THE INVENTION

The subject invention overcomes the deficiencies in known systems and methods for coupling an annular antenna to an electrical device such as a transponder. An annular antenna is coupled to a transponder either directly or indirectly. According to one embodiment of the invention, a toroidal body composed of material having high electromagnetic permeability is coupled to a transponder device by a winding. The antenna loop is passed directly through the center opening in the toroid and magnetically couples directly with the toroid body without utilization of a winding or mechanical connection. Electrical coupling occurs between the loop and the toroid, and therefore into the winding to the transducer because the current induced in the loop antenna from the transceiver magnetic field creates a magnetic near the loop. Thus, the magnetic field is induced directly into the toroid body that closely surrounds the antenna loop wire(s). Such a coupling is hereinafter designated as Direct Magnetic Coupling (DMC). The DMC approach allows the antenna loop to pass through the transponder package without a mechanical connection and therefore eliminates the problems with making and maintaining a mechanical connection between the loop wire and the transponder package. The winding coupling the toroid to the transponder package may be varied to accommodate optimum impedance matching. Consequently, the DMC technique provides a high energy coupling with high resistance to breakage since a mechanical connection between the antenna loop and the transponder is avoided. Furthermore, the process of attaching the antenna loop to a transponder is simplified and remote coupling between wire bundles or cables and transponders is facilitated. Moreover, the magnetic coupling between an annular antenna and transponder using the DMC technique is maintained in a continuous 360 degree read and dead zones in the interrogation area are avoided.

According to another aspect of the invention the annular assembly is attached to the tire at a location that provides low exposure to strain and low vulnerability to electromagnetic influence from the metallic wheel rim.

Pursuant to yet another aspect of the invention, the antenna and the transponder are at least partially embedded into a non-conductive carrier strip to form a ring assembly to render the antenna and transponder package unitarily transportable. Such an assembly may be incorporated into a tire during the tire manufacturing process but preferably is attached to the tire by adhesives or other known methods in a post-manufacture attachment procedure. The carrier strip serves at least a fourfold purpose. First, the strip protects the integrity of the antenna wire and transponder encapsulated therein. Secondly, the strip creates a unitary assembly that may be conveniently transported, inventoried, and deployed to retrofit existing tires with a monitoring system or to replace defective components should the need arise. Thirdly, the strip maintains the antenna in an intended optimal position relative to the transponder toroidal body through which it extends. Finally, the carrier strip serves to maintain an optimal orientation of the transponder to the tire cavity.

According to a further aspect of the invention, a method is provided for associating a loop antenna with an electronic device such as a transponder and the location of the antenna-transponder assembly on a tire in a position that protects the assembly from strain induced by tire operation and electromagnetic interference from the wheel rim. The method further comprises the steps of coupling the loop antenna to the electronic device either directly or indirectly as through a toroidal body such as a transformer. A further step includes at least partially encapsulating the antenna and the electronic device package in a non-conductive carrier strip material so as to render the antenna and the transponder package unitarily transportable and to fix the relative positions of the antenna and transponder into respective optimal orientations.

The advantages of the invention, which will be apparent to those skilled in the art, are achieved by preferred and alternative embodiments that are described in detail below and illustrated by the accompanying drawings.

DEFINITIONS

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements.

"Circumferential" most often means circular lines or directions extending along the perimeter of the surface of the annular tread perpendicular to the axial directs; it can also refer to the direction of the sets of adjacent circular curves whose radii define the axial curvature of the tread, as viewed in cross section.

"Inner" means toward the inside of the tire and "outer" means toward its exterior.

"Lateral" means in a direction parallel to the axial direction.

"Radial" and "radially" mean directions radially toward or away from the axis of rotation of the tire.

"Shoulder" means the upper portion of sidewall just below the tread edge.

"Sidewall" means that portion of tire between the tread and the bead.

DETAILED DESCRIPTION OF THE PREFERRED EMBODIMENTS

As used herein, a "transponder" is an electronic apparatus (device) capable of monitoring a condition such as air pressure within a pneumatic tire, and then transmitting that information to an external device. The external device can be either an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. A toroidal body composed of a material of high electromagnetic permeability is coupled to the transponder by a winding. In conventional systems, the antenna is coupled to the toroidal body by means of a primary winding and the transponder is coupled to the toroidal body by means of a secondary winding. As explained below, the primary winding is eliminated in accordance with the practice of the subject invention. The "secondary" winding that couples a transponder to the toroidal body hence is referred to herein as merely the "winding". For the purpose of the subject disclosure and the invention, the annular system is not transponder specific. That is, a wide range of commonly available transponders, sensors, and associated electronics may be packaged and utilized with the subject invention.

As used herein, a "toroid" is a body formed from material having a high elector-magnetic permeability by a continuous curved surface and includes a central through bore. The toroidal body may be cylindrical, oblong, symmetrical, or asymmetrical without departing from the invention herein set forth. As used herein, a "toroidal body" thus includes a transformer having one or more windings.

In order to send or receive RF signals, a transponder must have an antenna. The antenna is annular in configuration in the subject invention and may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, flexible circuits, conductive film, conductive rubber, etc.

Figure 1:
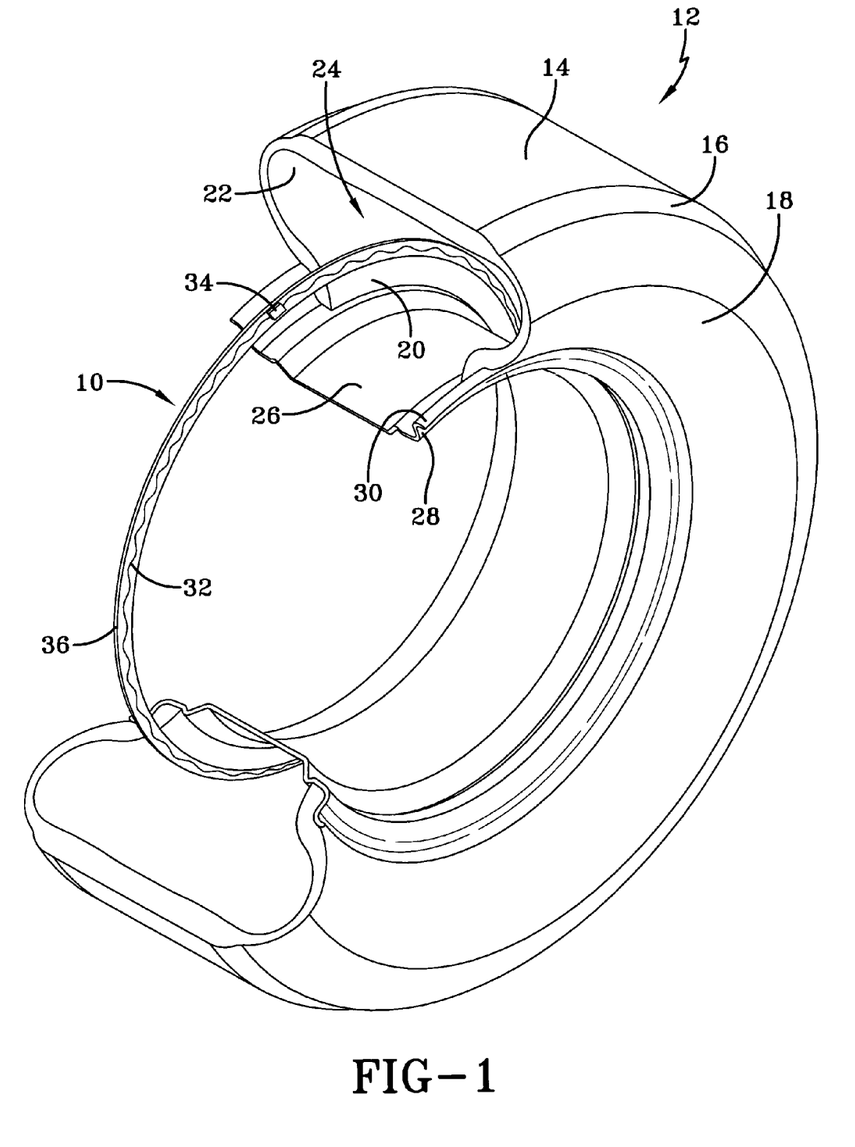
FIG. 1 is a perspective view of a tire and the subject annular apparatus with portions of the tire removed for the purpose of illustration.

Referring initially to FIG. 1, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Included as part of the apparatus 10 is a carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the transponder module 34 in the manner described below. In the post manufacturing state, therefore, the apparatus 10 comprising antenna 32, transponder module 34, and carrier strip 36, in a unitary, generally circular, semi-rigid assembly that is readily transportable and handled for attachment to tire 12. The diameter of the apparatus assembly 10 is a function of the size of the tire 12 and the preferred attachment location thereon.

Figure 2:
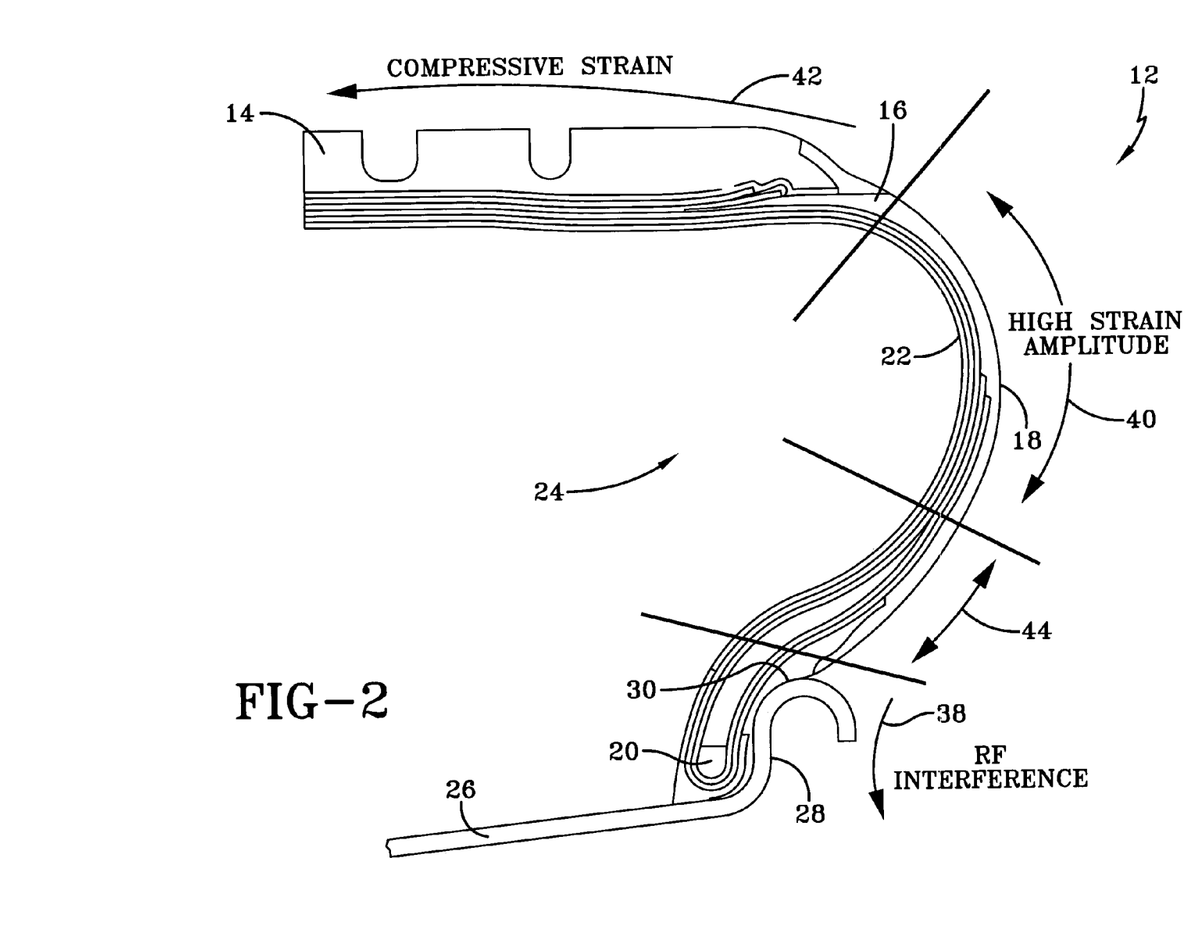
FIG. 2 is a sectional schematic of a tire mounted to a rim and illustrating alternative locations in which to mount the subject annular apparatus.

FIG. 2 illustrates a preferred location for annular apparatus 10 on a tire in accordance with the present invention. The tire 12 is mounted to a rim 26 in conventional fashion. The bead 20 of tire 12 is disposed within the rim 26 against flange 28. Upper surface 30 of the flange 28 is located above a lower edge of the tire bead 20. As will be appreciated, the flange 28 shields the lower portion of the tire 12 comprising bead 20 and defines an "RF INTERFERENCE" region 38 of the tire. A region 40 of tire 12 above region 38 at the sidewall 18 is further defined as a "HIGH STRAIN AMPLITUDE" region. As sidewall 18 flexes during operation of the tire on a vehicle, region 40 experiences a high level of strain. The region 42 located at the tread portion of the tire is referred to herein for explanatory purposes as a "COMPRESSIVE STRAIN" region. It is at region 42 that the tire 12 experiences a high level of compressive strain as the tire is operatively utilized.

In combined reference to FIGS. 1 and 2, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture. Adhesives commonly utilized in the industry for tire patch and repair may be employed. The location on the tire to which apparatus 10 is attached pursuant to the instant invention is region 44 in FIG. 2, located between the RF INTERFERENCE region 38 and the HIGH STRAIN AMPLITUDE region 40. It will be appreciated that region 38 would be equitable from a mechanical perspective since tire region 38 is relatively rigid, protected by rim flange 28, and, experiences a relatively low strain level during operation of the tire. From an electrical perspective, however, region 38 of the tire 12, shielded by rim flange 28, is ill suited as a location for the transponder 34.

Location of the apparatus 10 within region 40 of the tire sidewall 18 is an option. Such a location would avoid the RF Interference caused by the rim. However, the tire sidewall 18 experiences high levels of strain during operation of the tire. Consequent damage to or breakage of components affixed to the sidewall may occur. Similarly, location of the apparatus 10 at the tread region 42 of tire 12 would avoid RF Interference from the rim but the tread region experiences high compression strain during operation of the tire. Location of tire monitoring system devices in such a location would be therefore be undesirable from a mechanical perspective.

Consequently, apparatus 10 is preferably located pursuant to the invention within region 44 of the tire 12. Region 44 is generally an annular region located substantially between 10 to 30 millimeters above the upper surface 30 of the rim flange 28 when tire 12 is mounted to rim 26. Within region 44, the apparatus is free from RF Interference from the flange 28 of rim 26. Region 44 is further a relatively low strain amplitude region of the tire 12. Thus, region 44 of the tire 12 represents an optimal location for apparatus 10 that balances the need for minimal RF Interference from the rim while mechanically protecting the apparatus 10 from damage due to strain forces introduced into the tire during its operation.

Figure 3:
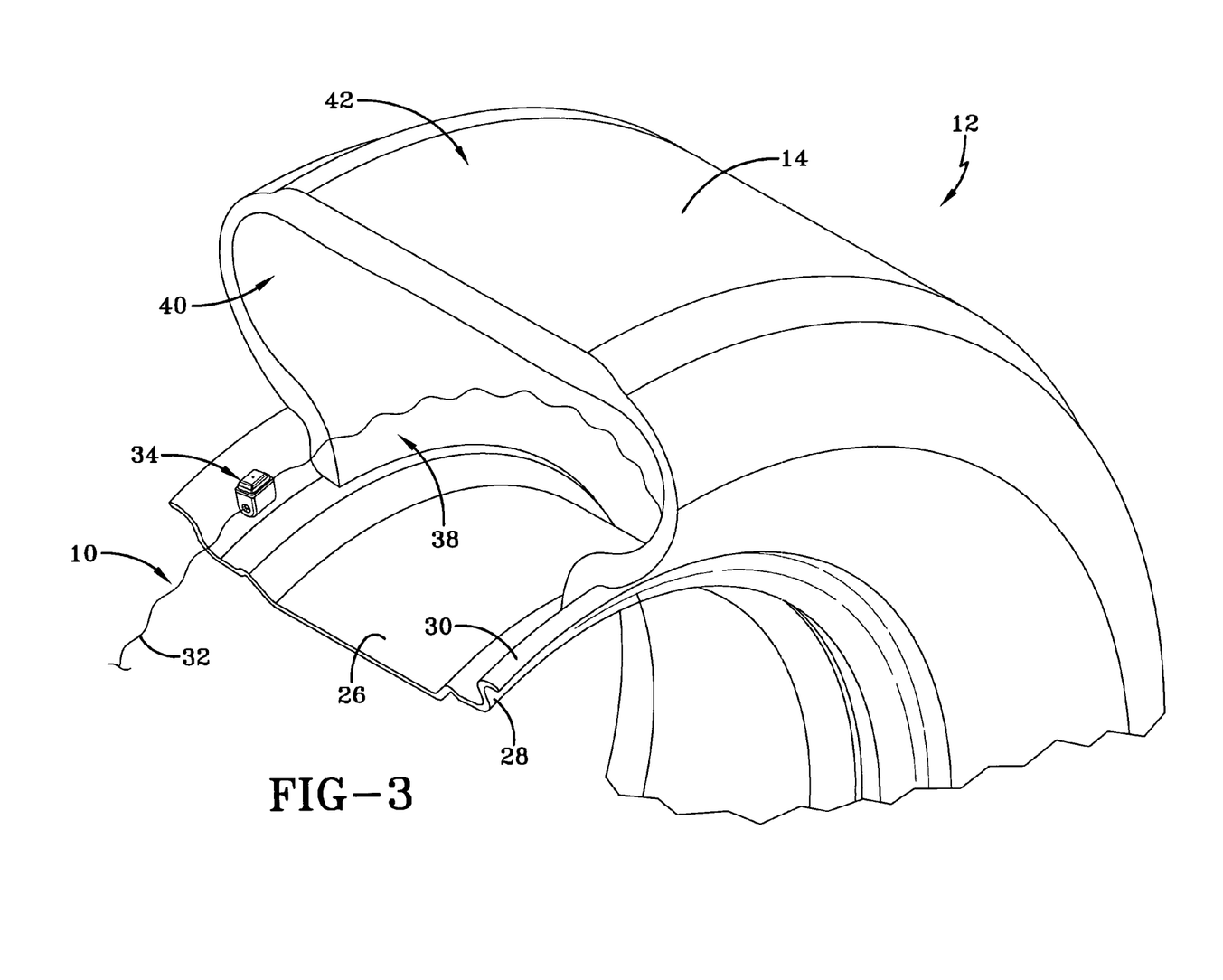
FIG. 3 is an enlarged perspective view of a tire portion having a transponder and antenna assembly positioned against a tire sidewall surface.

FIG. 3 illustrates an alternative embodiment of the subject apparatus 10 in which the carrier strip 36 is eliminated and the antenna 32 and transponder 34 are embedded directly within the tire 12 during its manufacture. The location of the antenna 32, again, is within region 44 described as optimal in the preceding paragraph; that is, approximately 10–30 millimeters above the rim flange surface 30 when tire 12 is mounted to rim 26. Attaching the apparatus 10 into tire 12 during its manufacture is possible pursuant to the invention but is not preferred since such a procedure would necessarily expose the transponder 34 and antenna to potentially damaging forces as the tire is formed. Also, implanting an exposed annular antenna 32 and transducer 34 makes replacement and repair of the assembly in the event of damage or breakage problematic. Consequently, it is preferable to attach the apparatus 10 to the tire 12 in a post manufacture process by adhesives or the like. The advantages of post manufacture assembly is that the apparatus 10 is spared the stress of the tire manufacturing process and the apparatus 10 may readily be removed and replaced in the event of breakage. Moreover, the unitary apparatus 10 shown in FIG. 1 may readily be retrofitted by adhesive to pre-manufactured or used tires. Finally, the annular apparatus is a unitary assembly and may be conveniently inventoried in a range of diametric sizes so as to fit various sized pre-manufactured tires.

Figure 4:
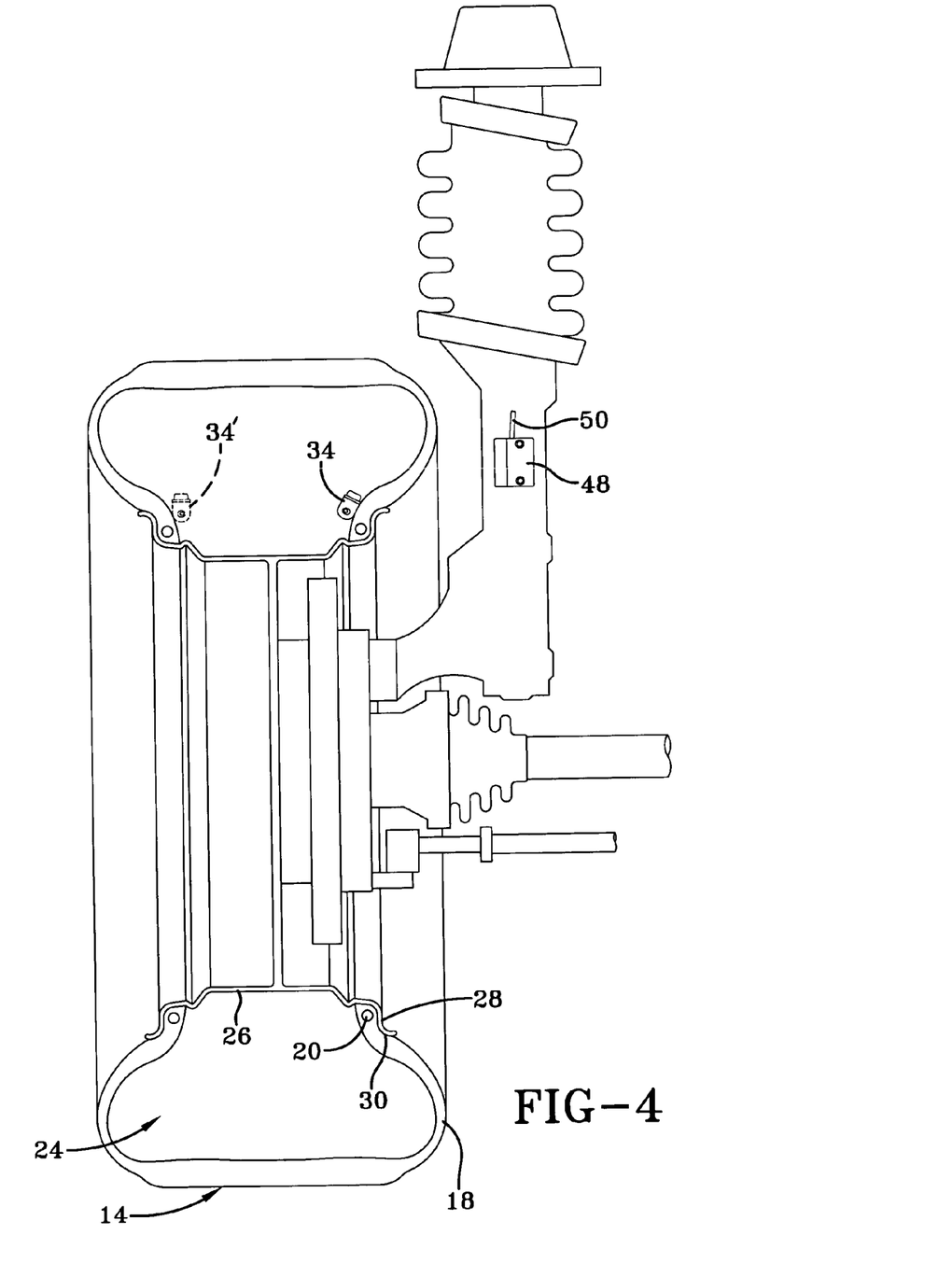
FIG. 4 is a sectional schematic view of a tire and wheel assembly mounted to a vehicle frame.

FIG. 4 shows the transponder 34 located at its preferred location on a tire 14 and exposed to the tire cavity 24. The transponder may include pressure and temperature sensors for monitoring the status of the cavity 24 and communicate such information to a remote transceiver 48 mounted to the vehicle frame 46. The transceiver 48 is positioned opposite the antenna of the apparatus 10 and is in continuous communication therewith throughout the 360 degrees rotation of the tire 14. Transceiver 48 is of a type commercially available in the industry and is electrically connected by lead 50 to conventional logic, processing and display electronics of the vehicle (not shown). As described previously, the position of the transponder module 34 is above the rim flange 28 so that RF communication between the transponder and the transceiver 48 is not impaired.

With collective reference to FIGS. 5–12, the configuration of the annular apparatus 10 will be explained in greater detail. The transponder module generally comprises a base housing 52 formed of rubber or plastic material by conventional means. The housing 52 includes opposite sidewalls 54, 56 joining along a radiused bottom surface 55 to opposite vertical end walls 58, 60. The walls 54, 55, 56, 58, and 60 define a central compartment 62. A through bore 64 extends through lower portion of the end walls 58, 60 in communication with the compartment 62.

The housing 52 further includes a cap member 68 likewise formed of conventional rubber or plastic material by conventional means such as injection molding. The cap member 68 includes an upper protrusion or "snout" 70 comprising vertical sidewalls 72 terminating at a horizontal upper surface 74. A sensor port or aperture 76 is positioned at the middle of surface 74 and extends therethrough. A flange 78 peripherally defines a lower boundary of cap 68 and provides a horizontal ledge surface 80 that merges at a right angle with the vertical sidewalls 72. The flange 78 is dimensioned to rest upon the upper end of the module base housing 52 as will be appreciated. The horizontal ledge surface 80 of cap 68 is disposed between the flange 78 and the vertical sidewalls 72. Upper sidewall portions 81 are provided that taper inwardly toward upper surface 74. The tapered profile of the cap 68 facilitates convenient and reliable manufacture of the apparatus 10.

In the illustrated embodiment, the transponder module 34 further includes a toroidal body (toroid) 82 composed of a material, such as a ferrite, having a high electro-magnetic permeability. The body 82 generally comprises a cylinder having an elliptical cross-sectional configuration. The elliptical sectional configuration of body 82 serves to reduce its vertical dimension and allows for a more compact packaging of the body 82 within a transponder module. The body 82 includes a winding 84, as shown, terminated to conductor leads 86. A central through bore 88 projects through the body 82 in an axial or longitudinal direction.

A protective sleeve member 90 is further provided sized for receipt and residence with the bore 88 of body 82. The sleeve 90 comprises generally an elongate cylinder having an elliptical cross-section. The sleeve 90 further includes a circumferential sidewall 92 and an axial or longitudinal through bore 94. Bore 94 is offset relative to the longitudinal axis of the sleeve 90 so as to create a wall 95 of increased thickness at an outward side of the sleeve 90. An outwardly open longitudinal channel 96 is formed within the wall 95 as shown. The sleeve 90 is closely received within bore 88 of body 82 and winding 84 is received within the channel 96 of sleeve 90.

With continued reference to FIGS. 5–12, a circuit board 98 mounts within the central compartment 62 of the transponder base housing 52. Circuit board 98 is typically configured to comprise an electronic package 100 mounted to an upper surface 102 and may include an electronic package 106 mounted to an underside 104. The electronic packages 100, 106 are generically depicted in FIGS. 5–12 and include the transponder sensors, logic, and RF transmitting systems necessary to perform tire cavity monitoring activity. The subject invention is not transponder design specific and any one of multiple conventional transponder systems may be utilized and mounted to one or both surfaces 100, 104 of circuit board 98. The board 98 further includes lead receiving channels 108 fabricated within a board side.

Assembly of the transponder module proceeds generally as follows. The sleeve 90 is inserted within the through bore 88 of the toroidal body 82 which is then inserted into the chamber 62 of the housing base 52. Situated within chamber 62, the through bore 94 of sleeve 90 and the bore 99 of body 82 co-axially align with housing through bore 64. The winding 84 of body 82 is received within channel 96 of the sleeve 90 and leads 86 are routed upward. The number of turns in winding 84 is designed to impedance match the transponder electronics in a conventional manner. The board 98 mounts horizontally in the preferred embodiment within the housing 52 above the sleeve 90 and the toroidal body 82 through passage. Leads 86 from the winding 84 are routed into the channels 108 and electrically connected to the electronics 100, 106 on circuit board 98. The peripheral flange 78 of the cap member 68 is thereafter positioned upon the upper surface 66 of the housing 52 and the interface is sealed by application of a suitable adhesive.

Figures 7, 8:
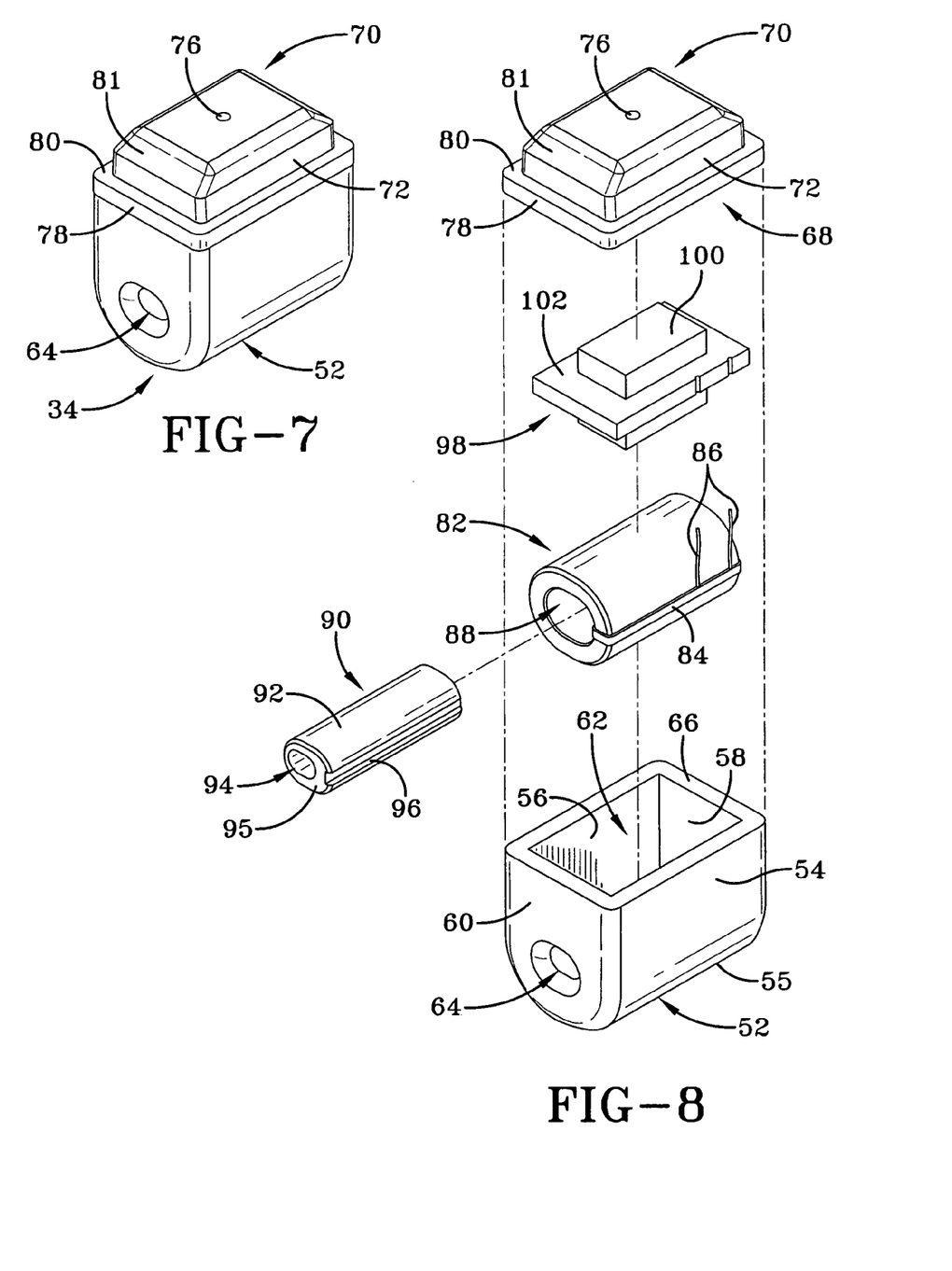
FIG. 7 is a front perspective view of the subject transponder module.
FIG. 8 is an exploded perspective view thereof.
Figure 9:
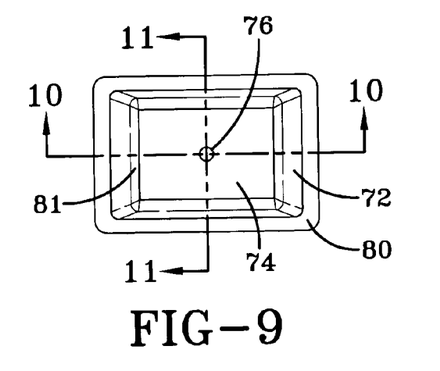
FIG. 9 is a top plan view thereof.
Figure 10:
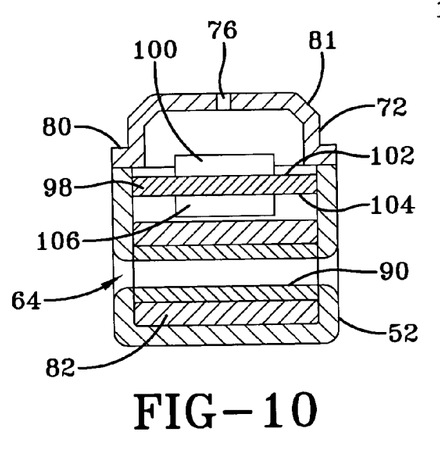
FIG. 10 is a longitudinal section view through the transponder module of FIG. 9 taken along the line 10—10.
Figure 11:
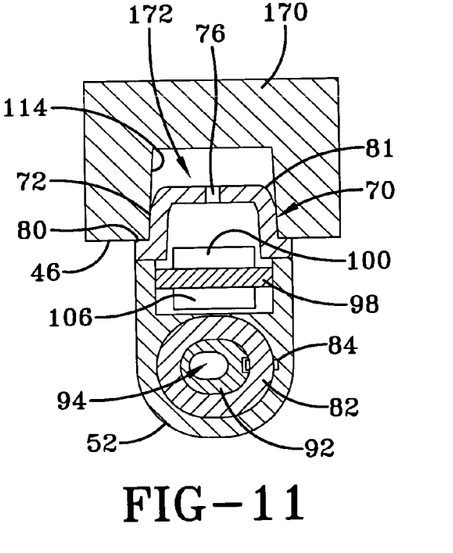
FIG. 11 is a transverse section view through the transponder module of FIG. 9 taken along the line 11—11.
Figure 12:
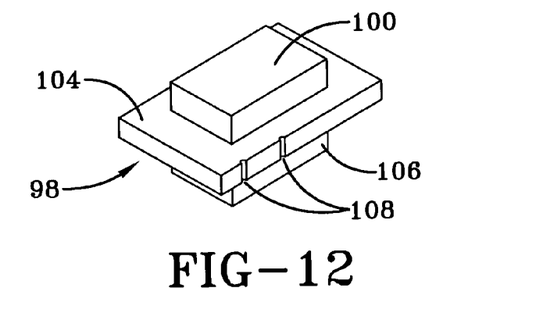
FIG. 12 is a perspective view of the module circuit board.
Figure 13:
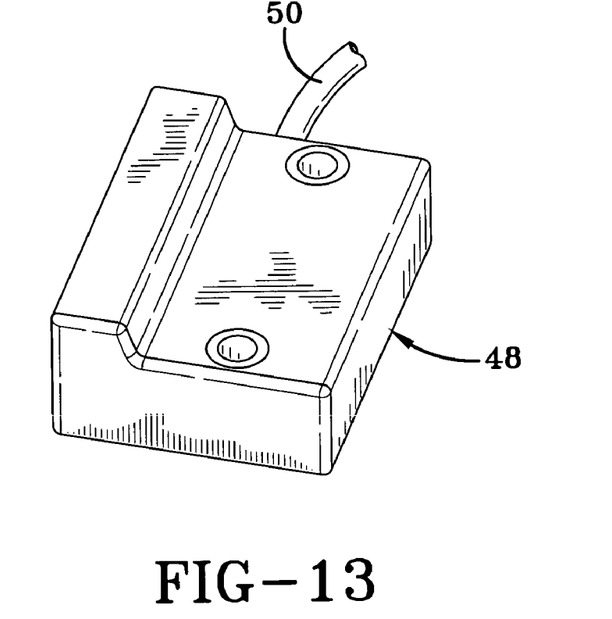
FIG. 13 is a perspective view of the receiver module.

In the assembled condition, the transponder module 34 is as shown in FIG. 7. The transponder module housing, internal assembly, and component orientation may be varied if desired in the practice of the invention. The transponder module 34 thus comprises a sealed self contained unit that includes circuit board and transponder electronics for monitoring parameters of a tire cavity such as pressure and temperature. The electronics of the transponder module 34 may further include tire identification information. The toroidal body 82 is electro-magnetically and mechanically coupled to the transponder package 24 via winding 84. Alternatively, the body 82 may be eliminated and the antenna 32 electrically coupled directly to the transponder. The resultant annular assembly would likewise be positioned in the optimum location described above in a tire. A further alternative would be to couple the antenna 32 to the transponder through a transformer of conventional configuration having primary and secondary windings.

Figure 5:
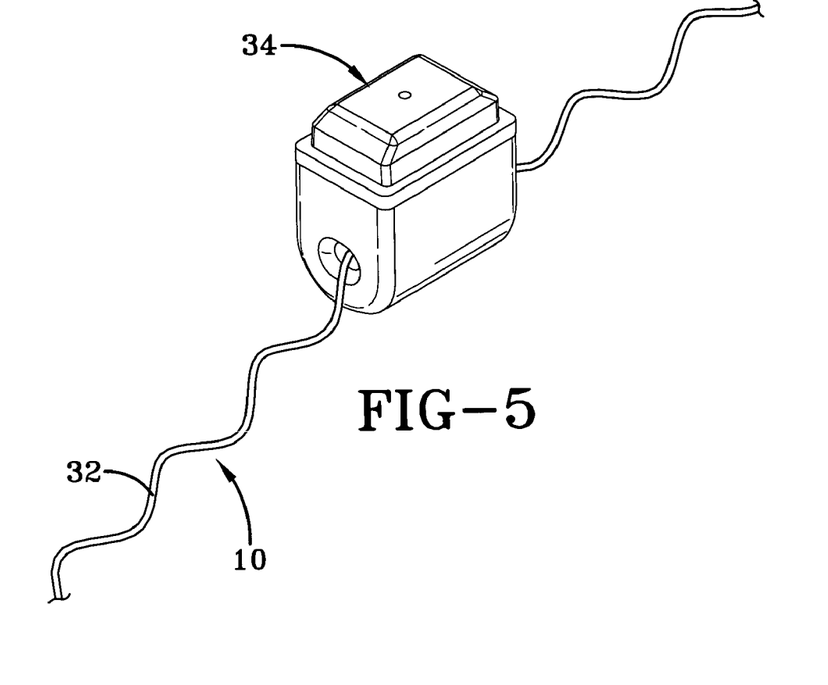
FIG. 5 is an enlarged perspective view of the subject antenna projecting through a transponder module.

The antenna 32 is routed through the transponder module 34 as seen best from FIG. 5 and comprises a continuous loop. The antenna 32 in the preferred embodiment is formed into a sinusoidal configuration, the sinusoidal shape serving to provide antenna elongation capacity with which to counter strain forces in the tire from its operation. The antenna 32 projects through bore 94 of sleeve 90, the bore 88 of body 82, and the through bore 64 of housing 52 in non-contacting manner. The antenna 32 is thus mechanically decoupled from the transponder module 34. It will be noted that the toroidal body 82 functions as a transformer in which the primary winding is eliminated. The antenna loop 32 is passed directly through the through bore 88 of the toroid 82 and couples magnetically with the body absent a primary winding. Electrical coupling occurs between the loop 32 and the toroidal body 82, and therefore into the winding 84 because the current induced in the loop antenna 32 from the transceiver 48 magnetic field creates a magnetic near the loop. The magnetic field is induced directly into the toroidal body 82 that closely surrounds the antenna loop wire(s) 32.

Such a coupling, designated herein as Direct Magnetic Coupling (DMC), affords several distinct advantages. The DMC approach allows the antenna loop to pass through the transponder package without a mechanical connection and therefore eliminates the problems with making and maintaining a connection between the loop wire and the transponder package discussed previously. The winding 84 turn ratio may be varied to accommodate optimum impedance matching Secondly, the DMC technique provides a high energy coupling. Furthermore, the process of attaching the antenna loop to a transponder is simplified rendering the remote coupling between wire bundles or cables and transponders substantially less difficult. Moreover, the magnetic coupling between annular antenna and transponder using the DMC technique is maintained in a continuous 360 degree read and dead zones in the interrogation area are avoided.

As discussed previously, the assembly of FIG. 5 may be embedded into a tire during its manufacture, resulting in the tire assembly shown in FIG. 3, although it is not preferable to do so. Incorporation of the annular apparatus during tire build imposes substantial strain into the tire monitoring components and may result in component breakage. In a post cure state, removal of an annular assembly or any component therein may be difficult or impossible. Consequently, it is preferred that the subject annular assembly be affixed to a tire as a post tire build operation.

Figure 6:
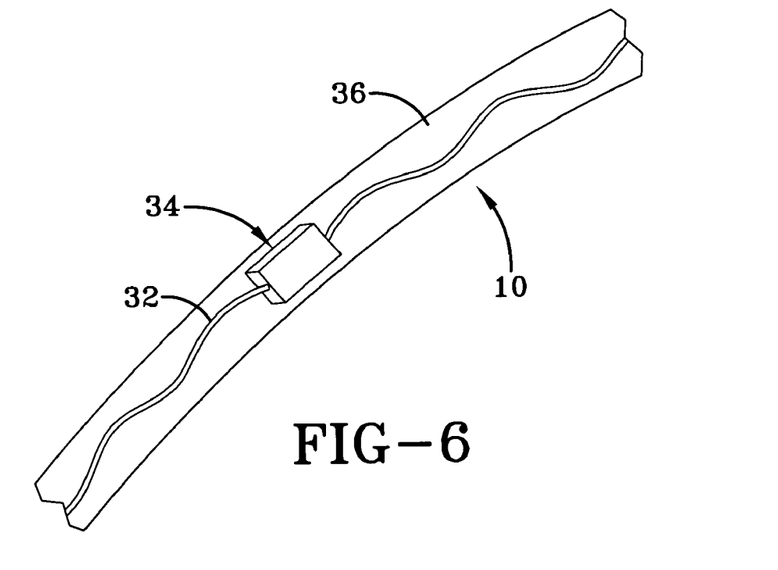
FIG. 6 is an enlarged perspective view of a portion of the subject annular assembly.

To do so, the antenna 32 and transponder module subassembly are first embedded within a rigid or semi-rigid carrier strip 36 shown in FIGS. 1 and 6. The strip 36 is formed from a non-conductive encapsulant material such as rubber or plastic and an annular assembly results that is unitary and readily transported, stored, and handled. Creation of a unitary combination of antenna, transponder, and carrier strip facilitates ease of incorporation of the annular assembly into a tire in a post build procedure. The assembly is positioned against the tire liner 22 at a location within the optimum region 44 discussed previously. The strip 36 is adhered to the tire by application of commonly available adhesives. Should the antenna transponder module break in transit or malfunction, the assembly 10 may be removed and replaced without damaging the tire. Moreover, the encapsulant material further serves to maintain the antenna and the toroidal body in their intended mutual orientation.

In order to facilitate the ready incorporation of the transponder module 34 into the carrier strip 36, the housing of the transponder 34 comprising cap 68 and base housing 52 are of a unique stepped and tapered configuration. The cap comprises the tapered snout 70 at an upper end defined by inward tapering surfaces 81. The cap 68 steps outward at the lower peripheral edge flange 78. As best viewed from FIGS. 7 and 11, the housing snout 70 is received within a cavity 112 within a mold block 110. The tapered profile renders the transponder housing self registering and centers the housing within cavity 112 prior to introduction of the carrier strip material. In the centered position, sidewalls 114 of the mold block 110 closely abut against cap surfaces 72 and lower surfaces 115 of block 110 abut the upper surface 80 of cap flange 78 to isolate and protect the snout 70 of cap 68 within the mold cavity 112. A bottom half of the mold block (not shown in FIG. 11) closes against the lower surfaces 115 of block 110 and material to form the carrier strip 36 is introduced into the mold cavity. Sealing abutment between mold block surfaces 114, 115 and cap surfaces 72, 80 prevent the carrier material from entering cavity 112 and thereupon invading the transponder aperture 76. Material forming the carrier strip 36, it will be appreciated, is filled up to the surface 80 of the flange 78, entirely encapsulating the antenna 32 and partially encapsulating the base 52 of the transponder module 34.

The mold halves are separated and the annular carrier strip with integrally captured antenna and transponder package removed from the mold. The subject annular assembly is thereafter affixed to the inner liner 22 of the tire 12 in the manner described previously and shown in FIGS. 1 and 6. The transponder module 34 may be oriented flat against the carrier strip as shown in FIG. 3 or oriented on end as shown in broken line at 34'. Whichever orientation is utilized, the strip material 36 serves to maintain the transponder and antenna in a preferred optimal mutual orientation and the transponder module 34 in an optimal orientation relative to the tire cavity. The port 76 in the upper surface 74 of the cap 68 is exposed to the tire cavity 24 free of the carrier strip 36. Direct communication between the tire cavity 24 and sensors mounted to the circuit board 98 is thereby facilitated through port 76. The stepped and tapered configuration of the transponder module 34 is preferred in order to make the module self centering in the mold and to allow a seal to be established between the mold and outer surfaces of the transponder module. The annular path defined between ledge surface 80 and vertical surface, sidewalls 72 of cap 68 and the inward facing surfaces of mold sidewalls 114 deters the flow of carrier material into cavity 112. Were the flow of material not inhibited, the material could enter cavity 112 and proceed through port 76 to the circuit board 90. The electronics and sensors mounted upon circuit board 98 are thus protected during the process of molding carrier strip 36 around the transponder module base 52 by the stepped configuration of the transponder housing.

Figure 14:
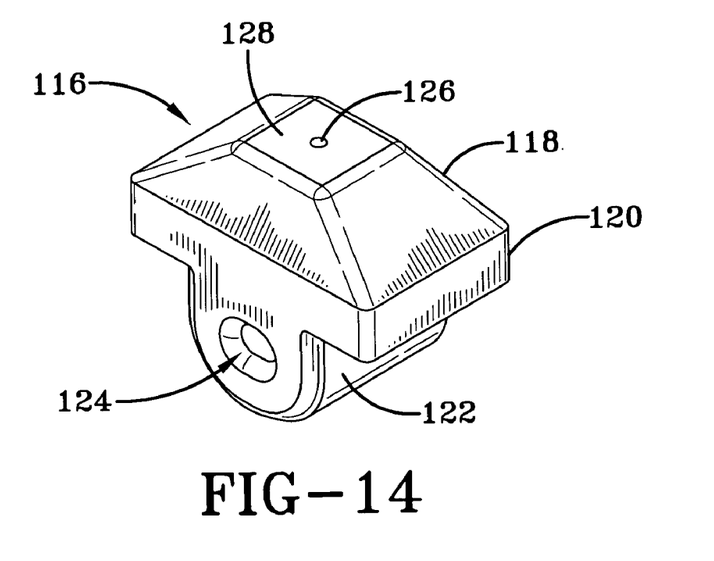
FIG. 14 is a perspective view of an alternative embodiment of the transponder module.
Figure 15:
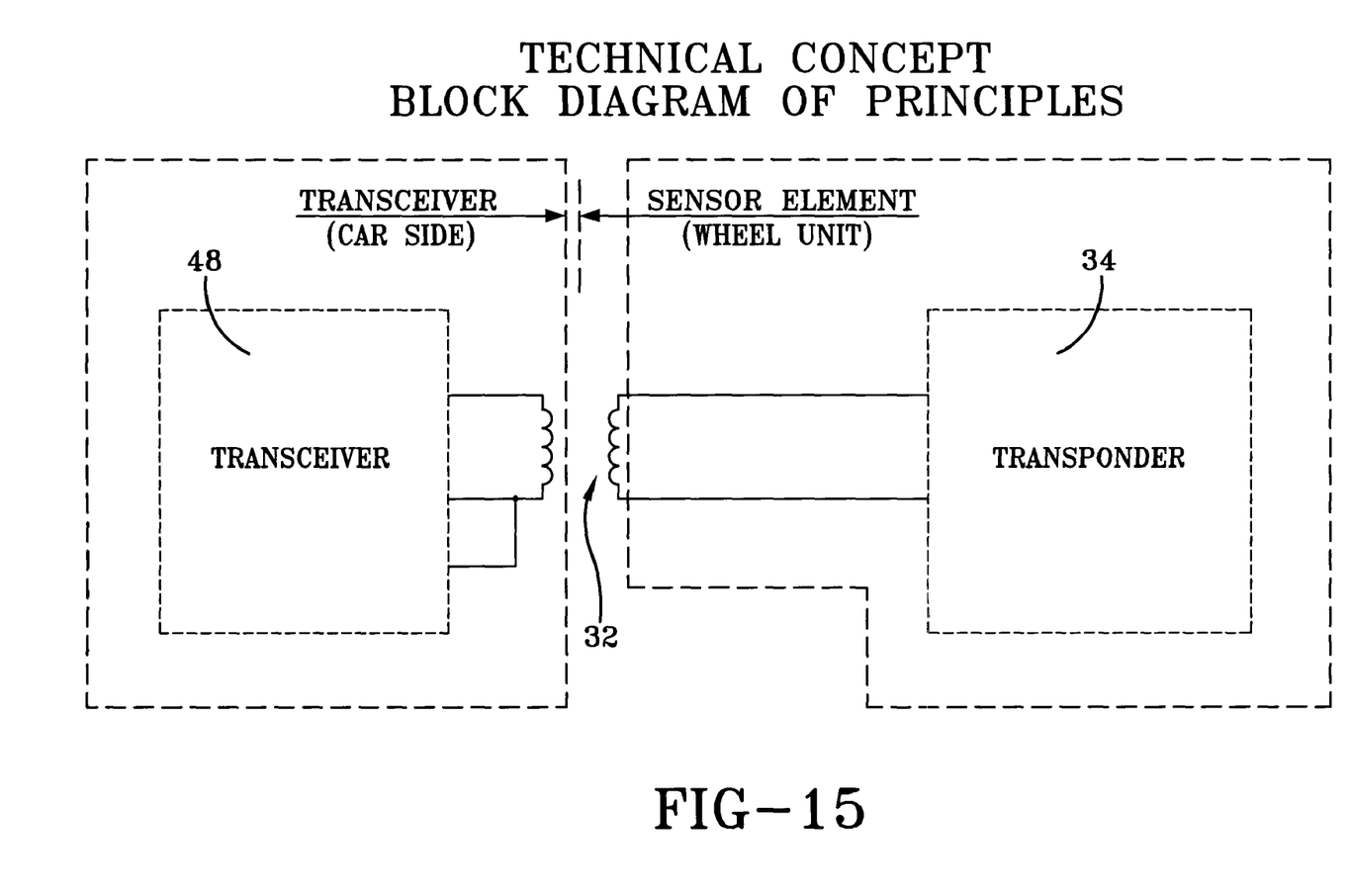
FIG. 15 is a block diagram of the car transceiver and tire monitoring system.

FIG. 14 depicts an alternatively configured transponder module 116 having a pyramidal cap 118 and base 120. The base housing 120 provides a through bore 124 in a like manner to the preferred embodiment described previously. The sides of the cap 118 taper inward to upper surface 128 having a central access port 126. Other variations to the configuration of the transponder module housing that utilize the teachings herein set forth are intended to be within the scope of the subject invention.

From the foregoing, it will be appreciated that the subject invention overcomes the deficiencies in known systems and methods for coupling an annular antenna to an electrical device such as a transponder. Pursuant to the invention, a toroidal body having high electromagnetic permeability is coupled to the transponder device by a variable turn winding. An antenna loop is passed directly through the center opening in the toroid and magnetically couples directly with the toroid body without utilization of a winding or mechanical connection. A high magnetic coupling occurs between the antenna loop and the toroid, and therefore into the winding to the transducer because of the current induced in the loop antenna from the transceiver. Elimination of a mechanical connection between the antenna and the transponder avoids the problems with making and maintaining a mechanical connection between the antenna loop wire and the transponder package. A high energy coupling with minimal risk of breakage is thereby achieved. Moreover, the annular assembly may be attached pursuant to another aspect of the invention to the tire at a location that provides low exposure to strain and low vulnerability to electromagnetic influence from the metallic wheel rim. In the preferred embodiment, the antenna and the transponder are at least partially embedded into a non-conductive carrier strip to form a ring assembly to render the antenna and transponder package unitarily transportable. The carrier strip further acts to protect the integrity of the antenna loop and the transponder components. Such an assembly may be incorporated into a tire during the tire manufacturing process but preferably is attached to the tire by adhesives or other known methods in a post-manufacture attachment procedure. The carrier strip protects the integrity of the antenna wire and transponder encapsulated therein; creates a unitary assembly that may be conveniently transported, inventoried, and deployed to retrofit existing tires with a monitoring system or to replace defective components should the need arise; maintains the antenna in an optimal relationship to the transponder toroid body through which it extends; and serves to facilitate an optimal orientation of the transponder to the tire cavity.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. An annular antenna apparatus comprising:
   a toroidal body composed of a material having high electromagnetic permeability and the body having a through bore;
   an electrical device coupled to the toroidal body;
   a loop antenna disposed to extend axially through the through bore with clearance in direct magnetic coupled relationship with the toroidal body, the loop antenna comprising a continuous loop and having a configuration providing elongation capacity with which to counter externally originating strain forces imposed on the apparatus.

2. An apparatus according to claim 1, wherein the loop antenna is in mechanically de-coupled relationship with the toroidal body and is free to resiliently elongate without encumbrance from the toroidal body.

3. An apparatus according to claim 1 wherein the loop antenna lies substantially in a first plane that intersects the toroidal body opening at a substantially right angle.

4. An apparatus according to claim 1, wherein the electrical device comprises a transponder.

5. An apparatus according to claim 1, wherein the loop antenna comprises at least one wire.

6. An annular antenna apparatus comprising:
   a toroidal body composed of a material having high electromagnetic permeability and the body having a through bore;
   a transponder coupled to the toroidal body;
   a continuous loop antenna disposed to extend axially through the through bore with clearance in a magnetically coupled relationship and a mechanically de-coupled relationship with the toroidal body wherein the antenna is free to resiliently elongate without encumbrance from the toroidal body.

7. An apparatus according to claim 6, wherein the loop antenna lies substantially in a first plane that intersects the toroidal body opening at a substantially right angle.

8. An apparatus according to claim 6, wherein the loop antenna comprises at least one wire formed into a substantially sinusoidal wave conformation.

9. An apparatus according to claim 6, wherein the transponder and the toroidal body reside within a common housing.

10. In an annular antenna apparatus of the type comprising a toroidal body composed of material having high electromagnetic permeability and the body having a through bore; a transponder coupled to the toroidal body, and a loop antenna magnetically coupled to the transponder through the toroidal body, characterized in that the loop antenna is a continuous loop that extends axially through the central opening with clearance in a non-contacting and mechanically decoupled relationship with the toroidal body and the antenna is configured to resiliently elongate responsive to external forces applied to the antenna apparatus without encumbrance from the toroidal body.

11. An apparatus according to claim 10, wherein the loop antenna lies within a first plane normally disposed to the toroidal body through bore.

12. An apparatus according to claim 10, wherein the loop antenna is in direct magnetically coupled relationship and mechanically de-coupled relationship with the toroidal body.

13. An apparatus according to claim 10, further characterized as including a housing in which the toroidal body and the transponder commonly reside.

14. A method of associating a loop antenna with an electronic device through a toroidal body composed of a material of high elector-magnetic permeability and the body having a through bore, comprising the steps of:
   forming the antenna as a continuous loop capable of axial elongation in response to external forces exerted on the antenna;
   positioning the loop antenna to project axially through the through bore with clearance in non-contacting and mechanically decoupled relationship with the toroidal body such that the antenna is free to resiliently elongate without encumbrance from the toroidal body;
   establishing a direct magnetic coupling between the loop antenna and the toroidal body; and coupling the electronic device to the antenna through the toroidal body.

15. A method as set forth in claim 14, further comprising the step of orienting the loop antenna to lie within a first plane normally disposed to the toroidal body through bore.

16. A method according to claim 14, further comprising the step of locating the toroidal body and the electronic device within a common housing.

17. A method of associating a loop antenna with an electronic device through a toroidal body composed of a material of high electromagnetic permeability and the body having a central opening, comprising the steps of:
   establishing a magnetic coupling between the loop antenna and the toroidal body;
   coupling the electronic device to the antenna through the toroidal body;
   embedding at least a portion of the antenna loop and at least a portion of the electronic device in an electrically non-conductive encapsulant material to maintain the antenna loop and the toroidal body in a specified orientation.

18. A method according to claim 17, further comprising the step of extending the antenna through the toroidal body through bore in a mechanically de-coupled relationship therewith.

19. A method according to claim 18, further comprising the steps of:
   positioning the toroidal body in an orientation in which the antenna intersects the through bore at substantially a right angle; and
   employing the encapsulant material to maintain the toroidal body in said orientation.

20. A method according to claim 17, further comprising the step of employing the encapsulant material to render the toroidal body and the electronic device unitarily transportable.

* * * * *